V. A. DE CANIO.
MORTUARY REFRIGERATOR.
APPLICATION FILED MAY 22, 1908.

972,755.

Patented Oct. 11, 1910.

4 SHEETS—SHEET 2.

Witnesses:
C. H. Bertholf
F. Kohlberger

Victor A. DeCanio,
Inventor,
Mason Fenwick & Lawrence,
Attorneys

THE NORRIS PETERS CO., WASHINGTON, D. C.

V. A. DE CANIO.
MORTUARY REFRIGERATOR.
APPLICATION FILED MAY 22, 1908.
972,755.
Patented Oct. 11, 1910.
4 SHEETS—SHEET 3.
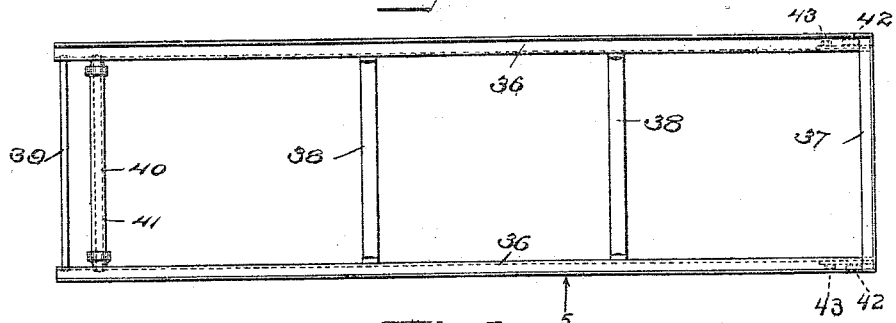
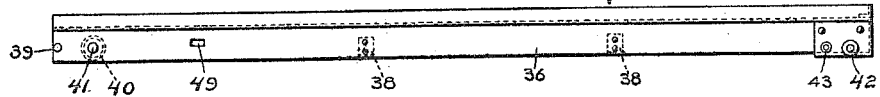
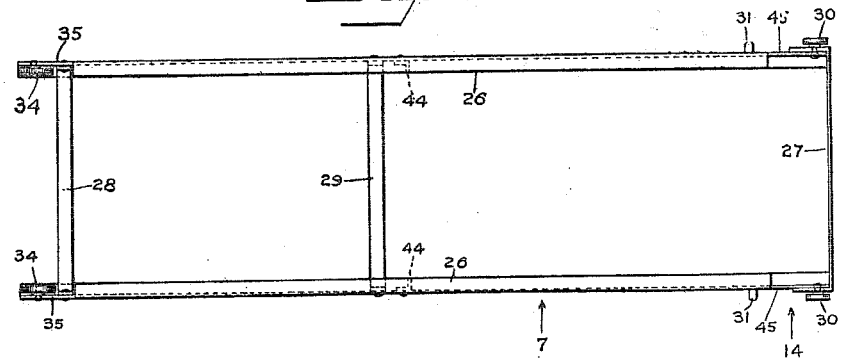
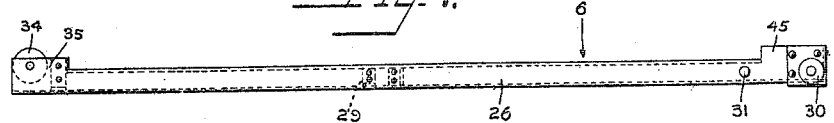
Witnesses:
C. H. Berthold
F. J. Kohlberger
Victor A. DeCanio,
Inventor,
Mason Fenwick Lawrence
Attorney.
THE NORRIS PETERS CO., WASHINGTON, D. C.

V. A. DE CANIO.
MORTUARY REFRIGERATOR.
APPLICATION FILED MAY 22, 1908.
972,755.
Patented Oct. 11, 1910.
4 SHEETS—SHEET 4.
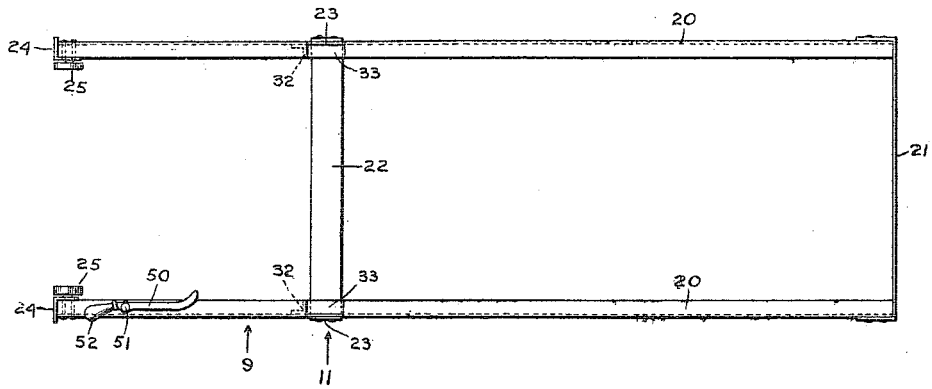
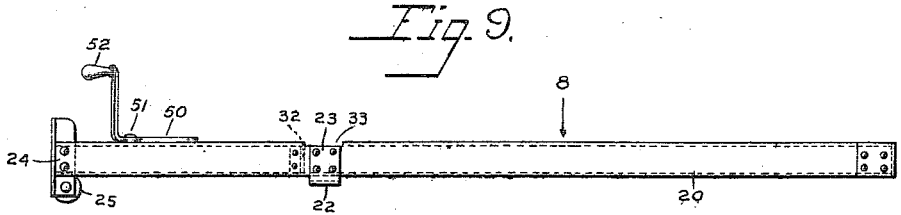
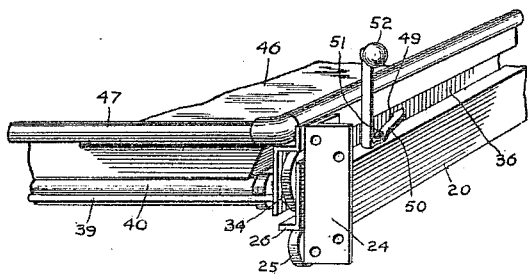

UNITED STATES PATENT OFFICE.

VICTOR A. DE CANIO, OF UNION HILL, NEW JERSEY.

MORTUARY REFRIGERATOR.

972,755.  Specification of Letters Patent.  Patented Oct. 11, 1910.

Application filed May 22, 1908. Serial No. 434,429.

*To all whom it may concern:*

Be it known that I, VICTOR A. DE CANIO, a citizen of the United States, residing at Union Hill, in the county of Hudson and State of New Jersey, have invented certain new and useful Improvements in Mortuary Refrigerators; and I do hereby declare the following to be a full, clear, and exact description of the invention, such as will enable others skilled in the art to which it appertains to make and use the same.

This invention relates to mortuary refrigerators and has for an object to provide a refrigerator embodying new and improved features of convenience, strength and sanitation.

A further object of the invention is to provide in a refrigerator a frame-work embodying all of the parts of the present invention which may be assembled at the factory and installed bodily in the cooling room when received at the morgue or other place of use.

A further object of the invention is to provide in a refrigerator of the class a containing pan and supporting frame-work which may be readily and conveniently removed from the cooling room structure for cleaning or other purposes.

With these and other objects in view, the invention comprises certain novel constructions, combinations and arrangements of parts, as will be hereinafter fully described and claimed.

Figure 1:
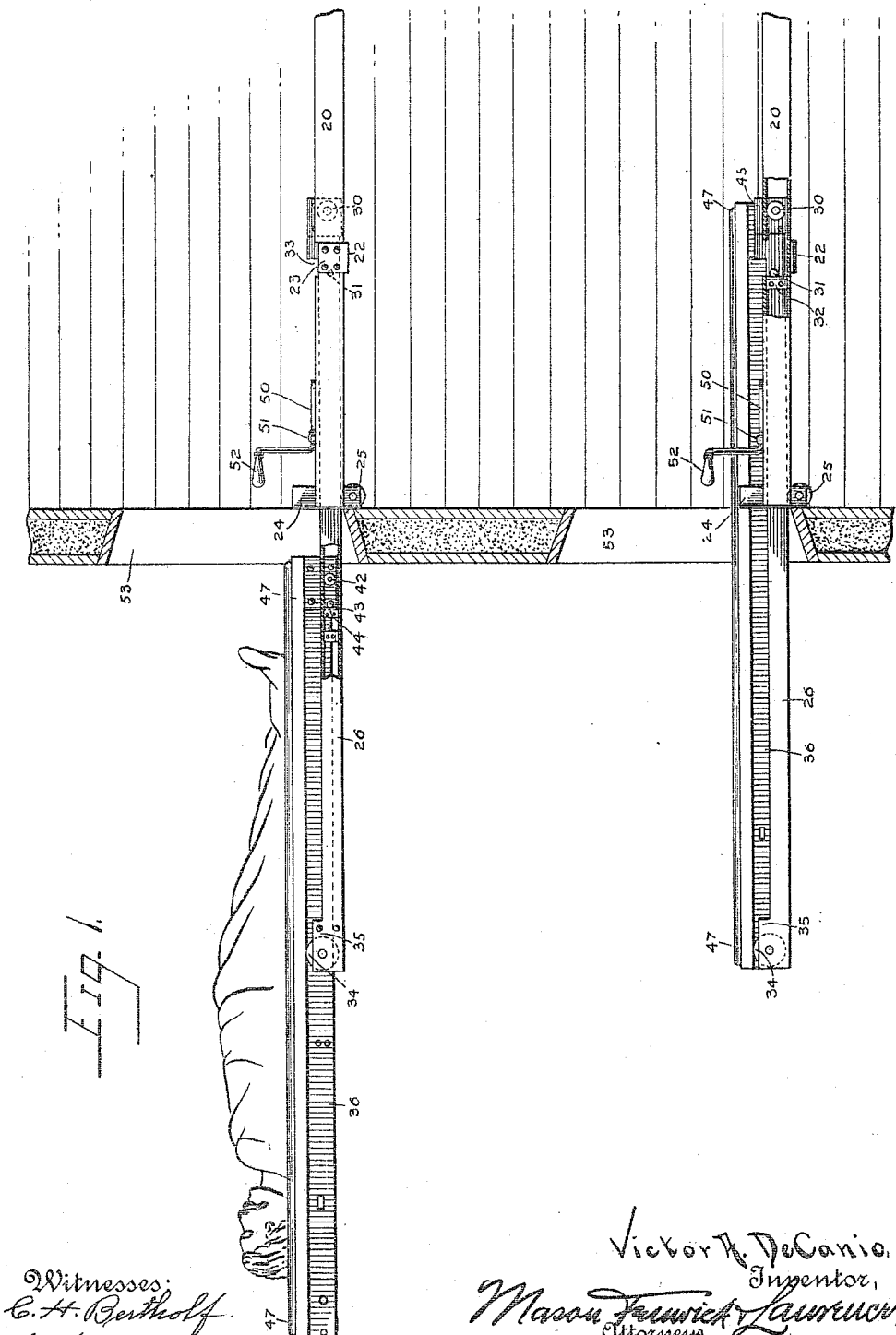
Figure 2:
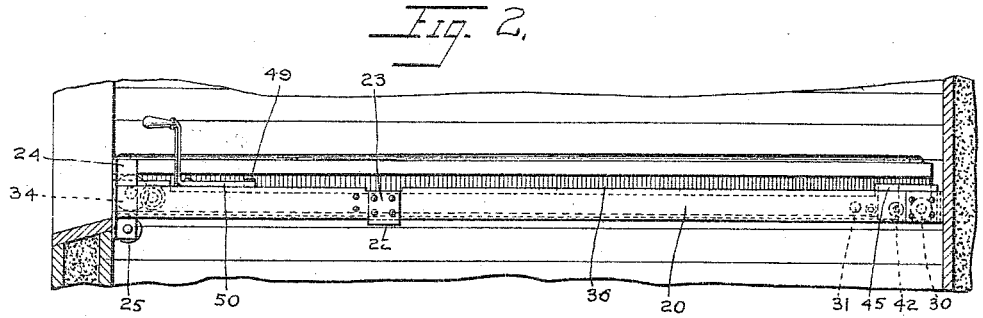
Figure 3:
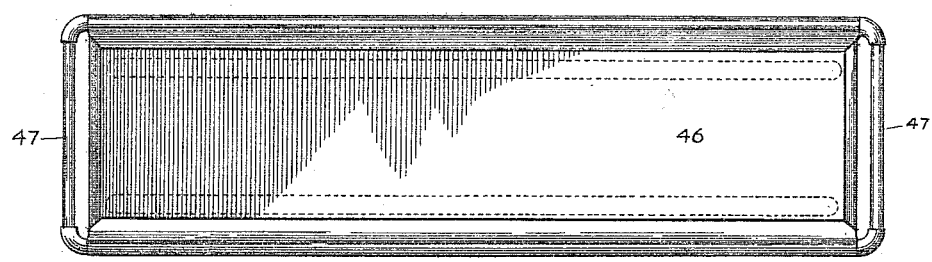
Figure 11:
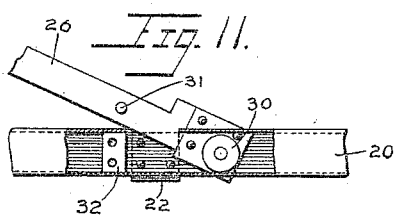
Figure 13:
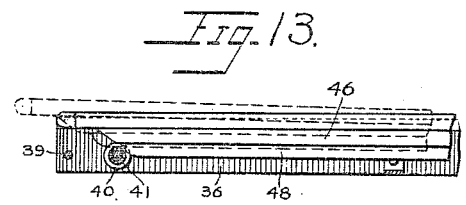
Figure 12:
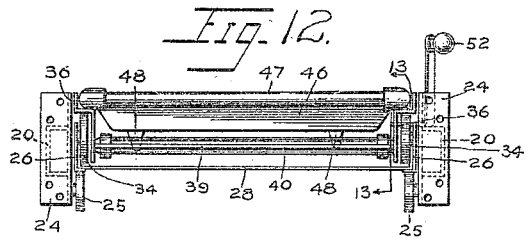
Figure 14:
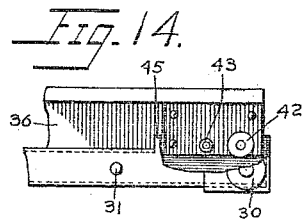

In the drawings:—Figure 1 is a view in side elevation of the present invention showing two units installed in the cooling room shown in vertical section, one of said units being shown fully withdrawn and the other half drawn. Fig. 2 is a view of one unit fully inclosed within the cooling room. Fig. 3 is a top plan view of the specific form of pan disclosed in this application. Fig. 4 is a top plan view of the pan supporting frame, as seen on arrow 4 of Fig. 5. Fig. 5 is a view of the pan supporting frame in side elevation seen on arrow 4 of Fig. 6. Fig. 6 is a top plan view of the intermediate frame as on arrow 6 of Fig. 7. Fig. 7 is a view in side elevation of the intermediate frame as on arrow 7 of Fig. 6. Fig. 8 is a top plan view of the stationary frame as on arrow 8 of Fig. 9. Fig. 9 is a view in side elevation of the stationary frame as on arrow 9 of Fig. 8. Fig. 10 is a fragmentary perspective view of one corner of the device in closed position. Fig. 11 is a fragmentary view in side elevation with parts broken away showing the means for removing the intermediate frame from the stationary frame, said view corresponding to the position indicated by the arrow 11 at Fig. 8. Fig. 12 is a view in end elevation of the parts assembled and in closed position. Fig. 13 is a fragmentary view of one end of the pan in side elevation with the side bar of the pan supporting frame broken away to show the relation and position of the pan relative to its supports. Fig. 14 is a fragmentary view in side elevation of the intermediate frame with parts broken away showing the means for removing the pan supporting frame therefrom and corresponding in position to arrow 14 of Fig. 6.

Like characters of reference designate corresponding parts throughout the several views.

In its specific form the invention disclosed in the present application comprises a frame embodying the side pieces 20 preferably composed of channel iron and also of the end cross piece 21 secured to the extremities of the side pieces 20 in any approved manner and a cross piece 22 intermediate the ends of the side frame 20 and secured thereto in any approved manner as by bending the ends 23 at right angles to the main extent of the cross piece 22 and secured to the external surfaces of the side pieces 20 by rivets. It is to be understood, of course, that the cross piece 22 may be secured by any well known mechanical means.

The frame just described (and which will hereinafter be known as the stationary frame) is provided with means for attaching to the door frame or jambs of the cooling room here shown as angle irons 24, such angle iron representing only one of many equivalent forms of securing the frame. At the ends of the side pieces 20 adapted to be secured to the door jamb of the cooling room rollers 25 are journaled extending within the lines of the frame pieces 20 as indicated particularly in Figs. 10 and 12. The periphery of the roller 25 extends very slightly above the upper surface of the lower flange of each side piece 20 so that the weight of any frame disposed thereon is carried upon the rollers 25. A frame composed of the side pieces 26 and preferably also composed of channel iron, and the end pieces 27 and 28 and cross piece 29 intermediate the ends is mounted upon the rollers 25 and will be hereinafter referred to as the intermediate frame. The intermediate frame is provided at its inner end with rollers 30 proportioned to operate between the flanges of the side pieces 20 and having a diameter slightly less than the interval between such flanges. It will thus be seen that as the intermediate frame is moved in relation to the stationary frame the rollers 30 move first upon the under flange of the side pieces 20 until the outer end of the intermediate frame overbalances the inner end when the upper part of the rollers 30 will engage upon the under side of the upper flange of the side pieces 20 while the side pieces 26 are themselves supported upon the rollers 25.

To limit the outward movement of the intermediate frame studs 31 are provided extending transversely from the side pieces 26 and spaced at a little distance from the rollers 30. The side pieces 20 are also provided with stops 32 against which the studs 31 engage when the intermediate frame has been withdrawn from the stationary frame a predetermined distance here shown as approximately two-thirds. To permit the intermediate frame to be removed from the stationary frame portions of the upper flange of the side pieces 20 are cut away adjacent the stop 32 as shown particularly at 33 particularly in Figs. 8, 9 and 11. To remove the intermediate frame the outer end of the intermediate frame is lifted so that the side pieces 26 are at an inclination as shown particularly in Fig. 11 when the stud 31 will be removed from engagement with the stop 32 and by an outward movement of the intermediate frame following such disengagement the roller 30 is drawn under the cut-out space 33 and by a depression of the outer end of the intermediate frame the roller 30 is lifted through such cut-out portion and the intermediate frame readily removed.

At their outer ends the side pieces 26 carry rollers 34 journaled thereon and extending above the upper flanges of the side pieces, the upper flange being cut out and turned upwardly as at 35 for the purpose of accommodating such rollers.

Upon the intermediate frame is mounted the pan supporting frame comprising side pieces 36 composed of structural material here shown as Z-iron. The side pieces are secured together by an end piece 37, intermediate pieces 38, and a rod or other approved cross piece or handle member 39, and with a roller 40 journaled between the side pieces 36 adjacent the outer end and also adjacent the cross bar 39. The roller 40 is of any approved construction here shown as composed of a pipe having caps at the ends and with a shaft 41 shown in dotted lines as extending through and forming an axis for the roller. Adjacent its inner end the pan supporting frame is provided with rollers 42 proportioned to move between the flanges of the side pieces 26 of the intermediate frame and of a diameter slightly less than the interval between such flanges. It will thus be seen that as the pan supporting frame is drawn outwardly it is carried upon the rollers 34, the central web of the side pieces 36 bearing upon the upper side of such rollers 34 and the roller 42 bearing against the lower flange of the side pieces 26. When the pan supporting frame has been drawn out sufficiently so that the outer end overbalances the inner end the inner end is lifted slightly and the upper side of the roller 42 then engages the under side of the upper flange of the side piece 36. To limit the outward movement of the pan supporting frame a stud 43 is provided on each of the side pieces 36 adjacent the roller 42 and positioned to contact against the stop 44 of the side pieces 26. The top flange of the side pieces 26 is slitted adjacent the inner ends and turned upwardly as shown at 45 producing a recess of sufficient amplitude to permit the roller 42 and stud 43 to be lifted therefrom when the pan supporting frame is at the extreme inward limit of its movement.

Upon the pan supporting frame a pan 46 is carried comprising a receptacle of any approved size and proportion and preferably provided with a frame composed of a pipe 47 rolled into the longitudinal edges of the pan material and such sides adapted to rest upon the central web of the Z-iron side frame pieces 36. The pan is also preferably provided upon its under side with substantially V-shaped ribs 48 proportioned to drop behind the roller 40 when the pan is in normal position and to be by said roller retained from longitudinal movement relative to the pan supporting frame but to permit the lifting of the outer end of said pan as shown in dotted lines in Fig. 13 when the ribs 48 will ride upon the roller 40 and assist in the removal of such pan from the pan supporting frame.

To maintain the frames within the cooling room and to permit the pan 46 to be removed therefrom without drawing the frames outwardly from the cooling room the pan supporting frame is provided with a notch or aperture 49 upon one side and a detent 50 is pivoted upon one of the side pieces 20 of the stationary frame as at 51 and is provided with a handle 52 extending above the level of the pan when in position so as to be easily reached through the door openings 53 by the operator.

It will thus be seen that with the several frames closed within the cooling room and the detent 50 in engagement with the aperture 49, the frames are maintained against removal and the pan may be easily removed by grasping one of the end pieces of the pipe 47.

It will be noted that the pan 46 is similar at opposite ends so that it may be inserted within the cooling room without regard to the end first inserted.

In ordinary use the pan is withdrawn from the cooling room by grasping the bar 39 or the part 47 of the pan and drawing toward the operator. The first movement will be the pan supporting frame moving along the intermediate frame until the stud 43 engages the stop 44 of the intermediate frame whereupon a continued drawing movement will move the intermediate frame relative to the stationary frames until the stud 31 engages the stop 32 when owing to the proportions of the several parts the pan is wholly withdrawn from the cooling room, so that the pan itself may be removed from the pan supporting frame or the contents of the pan examined or removed with convenience.

When the parts are to be cleansed or removed for repair or other purposes the intermediate frame is drawn to the outward limit of its movement carrying the pan supporting frame therewith remaining at the inner extreme of its movement. It will be seen that with the intermediate frame drawn outwardly the inner end of the pan supporting frame is within the cooling room but a short distance so that the operator can easily reach within the cooling room and lift the inner end of the pan supporting frame through the aperture caused by the upturned flange 45 and the pan supporting frame removed from the intermediate frame.

The outer end of the intermediate frame may then be lifted until the stud 31 clears the stop 32 when the roller 30 may be drawn and lifted through the aperture 33 and the intermediate frame removed from engagement with the stationary frame.

To return the several parts and frames to their normal position the steps for removal of the said parts are, of course, reversed and the parts inserted as will be readily understood.

Special attention is invited to the fact that the stationary and the intermediate frames are composed of channel iron or its equivalent providing spaced flanges between which rollers in the inner ends of the interengaging frame engage normally against the upper side of the lower flange until the inner end is over-balanced and then against the lower side of the upper flange while the intermediate portions of each moving frame is supported by a roller at the outer end of the frame upon which it moves.

Special attention is also called to the means for removing both the pan supporting frame and the intermediate frame from the structure both for installation purposes and for other reasons as cleansing and the like.

While the device heretofore described is particularly applicable to mortuary refrigerators I do not limit myself to its application for mortuary refrigerators only as the construction shown is applicable also to ordinary refrigerators and like receptacles.

What I claim is:—

1. In a device of the class described, a stationary frame embodying spaced flanges cut away to form an aperture intermediate their ends, a frame movable relative to the stationary frame, a roller carried by the movable frame disposed between the flanges of the stationary frame, and means carried by the movable frame adapted to limit its movement and to be withdrawn through the aperture of the flange.

2. In a device of the class described, a stationary frame embodying spaced flanges cut away to form an aperture intermediate its length, a stop carried by the stationary frame adjacent the aperture, a frame movable relative to the stationary frame and provided with a roller disposed between the flanges, means carried by the movable frame adapted to contact with the stop and proportioned to be lifted through the aperture of the flange.

3. In a device of the class described, a stationary frame embodying spaced flanges, one of which is cut away intermediate its length to form an aperture, a stop carried by the stationary frame adjacent the aperture, a roller journaled at one end of the stationary frame, a frame mounted and movable upon the roller and relative to the stationary frame, rollers journaled upon the movable frame and proportioned to travel between the flanges, means carried by the movable frame adapted to contact with the stop of the stationary frame, and proportioned to permit such stopping means and roller of the movable frame to be lifted through the aperture of the flange of the stationary frame.

4. In a device of the class described, a longitudinally movable frame embodying spaced flanges, one of which is cut away adjacent one end, a roller carried by the frame adjacent the end opposite the cut away portion, an article supporting frame provided with a roller engaged between the flanges of the movable frame, and adapted to be lifted through the cut-away portion of the flange, said article supporting frame resting and movable upon the roller of the movable frame.

5. In a device of the class described, a stationary supporting member, a plurality of frames mounted and movable on the stationary supporting member and relative to each other, a detent adapted to maintain the several frames against movement, and means adapting one frame for supporting an article.

6. In a device of the class described, a supporting frame, a frame movable longitudinally relative thereto, a roller journaled adjacent one end of the movable frame, a pan mounted on the frame, and ribs carried by the pan adapted to bear against the roller to maintain the pan in normal position and to bear upon the roller to facilitate the removal of the pan from the frame.

In testimony whereof I affix my signature in presence of two witnesses.

VICTOR A. DE CANIO.

Witnesses:
H. K. LETTERMAN,
HUGO MOCK.